(12) United States Patent
Lee et al.

(10) Patent No.: US 10,386,849 B2
(45) Date of Patent: Aug. 20, 2019

(54) ECU, AUTONOMOUS VEHICLE INCLUDING ECU, AND METHOD OF RECOGNIZING NEARBY VEHICLE FOR THE SAME

(71) Applicants: HYUNDAI MOTOR COMPANY, Seoul (KR); KIA MOTORS CORPORATION, Seoul (KR)

(72) Inventors: Tae Seok Lee, Seoul (KR); Seong Su Im, Suwon-si (KR); Seok Youl Yang, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/786,494

(22) Filed: Oct. 17, 2017

(65) Prior Publication Data

US 2018/0284803 A1 Oct. 4, 2018

(30) Foreign Application Priority Data

Mar. 28, 2017 (KR) .................. 10-2017-0039300

(51) Int. Cl.
*G05D 1/02* (2006.01)
*G06T 7/70* (2017.01)
(Continued)

(52) U.S. Cl.
CPC .......... *G05D 1/0246* (2013.01); *G05D 1/024* (2013.01); *G06K 9/00805* (2013.01); (Continued)

(58) Field of Classification Search
CPC ......... G05D 1/0246; G05D 2201/0213; G06K 9/4604; G06T 7/60; G06T 7/70
(Continued)

(56) References Cited

U.S. PATENT DOCUMENTS 9,360,556 B2 6/2016 Zhu et al.
2005/0004761 A1* 1/2005 Takahama ............. G01S 17/023
701/301
(Continued)

FOREIGN PATENT DOCUMENTS

JP 2013-167479 A 8/2013
JP 2014-92434 A 5/2014
(Continued)

*Primary Examiner* — Amandeep Saini
(74) *Attorney, Agent, or Firm* — Knobbe Martens Olson & Bear LLP

(57) ABSTRACT

Disclosed herein is a method of recognizing a vehicle near an autonomous vehicle. The method includes, using an autonomous driving logic of an electronic control unit (ECU) extracting nearby vehicle information by sensing at least one nearby vehicle from a distance sensed at each angle within a certain angular range. The method further includes calculating an misrecognition index indicating a degree of closeness of a shape of the nearby vehicle to a shape of an exhaust gas based on the nearby vehicle information, executing an exhaust gas removal algorithm for correcting the nearby vehicle information when the misrecognition index is greater than a threshold misrecognition index, and estimating movement of the nearby vehicle after a current frame using the nearby vehicle information or the corrected nearby vehicle information obtained through the exhaust gas removal algorithm.

13 Claims, 6 Drawing Sheets

(51) Int. Cl.
  *G06T 7/60* (2017.01)
  *G06K 9/46* (2006.01)
  *G06K 9/00* (2006.01)
  *G06K 9/32* (2006.01)

(52) U.S. Cl.
  CPC ......... *G06K 9/3241* (2013.01); *G06K 9/4604* (2013.01); *G06T 7/60* (2013.01); *G06T 7/70* (2017.01); *G05D 2201/0213* (2013.01); *G06K 2209/23* (2013.01)

(58) Field of Classification Search
  USPC ....................................................... 382/104
  See application file for complete search history.

(56) References Cited

U.S. PATENT DOCUMENTS

2012/0294482 A1    11/2012  Kasaoki
2016/0154094 A1*   6/2016   Ishimaru ............... G01S 17/936
                                                        356/4.01

FOREIGN PATENT DOCUMENTS

| JP | 2014-93028 A | 5/2014 |
| JP | 2016-1434 A | 1/2016 |

\* cited by examiner

FIG. 4

$$P_{gas} = \underbrace{|y_{diff}(t) - v_y(t)| \cdot \frac{w(t)}{w_{car}}}_{\text{Lateral movement}} - \underbrace{(x_{diff}(t) - v_x(t)) \cdot \frac{l(t)}{l_{bump}}}_{\text{Longitudinal movement}} + \underbrace{|w_{diff}(t)|}_{\text{Width change}} + \underbrace{||l_{diff}(t)||}_{\text{Length change}}$$

(a)

(b)

(c)

(d)

ECU, AUTONOMOUS VEHICLE INCLUDING ECU, AND METHOD OF RECOGNIZING NEARBY VEHICLE FOR THE SAME

CROSS REFERENCE TO RELATED APPLICATIONS

This application claims the benefit of Korean Patent Application No. 10-2017-0039300, filed on Mar. 28, 2017, which is hereby incorporated by reference as if fully set forth herein.

BACKGROUND

Field

The present disclosure relates to a controller (Electronic Control Unit, ECU) for autonomous driving of a vehicle, an autonomous vehicle including the controller, and a method of recognizing a nearby vehicle. More particularly, the present disclosure relates to a controller capable of improving recognition accuracy in consideration of characteristics of an exhaust gas when a nearby vehicle is recognized, an autonomous vehicle including the ECU, and a method of recognizing a nearby vehicle for the same.

Discussion of the Related Art

In recent years, there has been a growing interest in autonomous navigation technology. Autonomous navigation technology refers to technology that enables a vehicle to be automatically driven without driver intervention. In addition, when the vehicle travels autonomously, the distance to a preceding vehicle is recognized based on distance information acquired using a distance measurement sensor such as LiDAR, and operations such as lane change and smart cruise control (SCC) are performed based on such recognition.

However, in recognizing the distance from a preceding vehicle, exhaust gas discharged from the preceding vehicle is likely to be misrecognized as a vehicle. If the exhaust gas is detected as a preceding vehicle, the behavior of the host vehicle may be controlled irrespective of the actual movement of the preceding vehicle, which may cause serious safety hazards to the driver or put a following vehicle in danger through sudden braking or the like. Therefore, there is a need for a technique for preventing the exhaust gas from being misrecognized as a vehicle.

SUMMARY

Accordingly, the present disclosure is directed to an ECU, an autonomous vehicle including the ECU, and a method of recognizing a nearby vehicle for the same that substantially obviate one or more problems due to limitations and disadvantages of the related art.

An aspect of the present invention is to provide an ECU capable of minimizing influence of exhaust gas that causes misrecognition during travel of an autonomous vehicle, an autonomous vehicle including the ECU, and a method of recognizing a nearby vehicle for the same.

Additional advantages, objects, and features of the invention will be set forth in part in the description which follows and in part will become apparent to those having ordinary skill in the art upon examination of the following or may be learned from practice of embodiments the invention. The features and advantages of the invention may be realized and attained by the structure particularly pointed out in the written description and claims hereof as well as the appended drawings.

To achieve advantages in accordance with embodiments of the invention, as embodied and broadly described herein, a method of recognizing a vehicle near an autonomous vehicle includes an autonomous driving logic of an electronic control unit (ECU) extracting nearby vehicle information by sensing at least one nearby vehicle from a distance sensed at each angle within a certain angular range, calculating an misrecognition index indicating a degree of closeness of a shape of the nearby vehicle to a shape of an exhaust gas based on the nearby vehicle information, executing an exhaust gas removal algorithm for correcting the nearby vehicle information when the misrecognition index is greater than a threshold misrecognition index, and estimating movement of the nearby vehicle after a current frame using the nearby vehicle information or the corrected nearby vehicle information obtained through the exhaust gas removal algorithm.

In another aspect of the present invention, an electronic control unit (ECU) for an autonomous vehicle includes a nearby vehicle information extraction unit configured to extract nearby vehicle information by sensing at least one nearby vehicle from a distance sensed at each angle within a certain angular range and to calculate an misrecognition index indicating a degree of closeness of a shape of the nearby vehicle to a shape of an exhaust gas based on the nearby vehicle information, an exhaust gas misrecognition removal unit configured to execute an exhaust gas removal algorithm for correcting the nearby vehicle information when the misrecognition index is greater than a threshold misrecognition index, and a nearby vehicle information estimation unit configured to estimate movement of the nearby vehicle after a current frame using the nearby vehicle information or the corrected nearby vehicle information obtained through the exhaust gas removal algorithm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain features of the invention. In the drawings:

FIG. 4 illustrates an example of calculation of a misrecognition index;

DETAILED DESCRIPTION OF EMBODIMENTS

Figure 1:
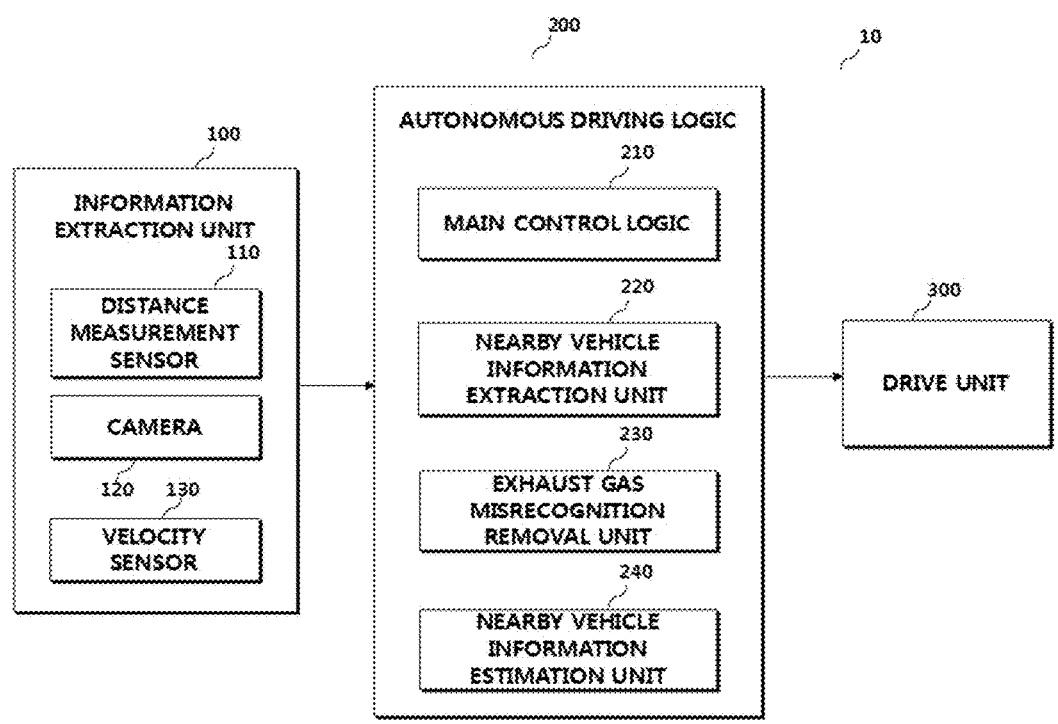
FIG. 1 is a block diagram schematically illustrating a vehicle according to an embodiment of the present invention.

Reference will now be made in detail to embodiments of the present invention, examples of which are illustrated in the accompanying drawings. Wherever possible, the same reference numbers will be used throughout the drawings to refer to the same or like parts. As used herein, the suffixes "module" and "unit" are added or used interchangeably to facilitate preparation of this specification and are not intended to suggest distinct meanings or functions. Accordingly, the terms "module" and "unit" may be used interchangeably.

According to an aspect of the present invention, a system and method for recognizing nearby vehicles is disclosed. At least one controller of the vehicle processes information/signals from sensors installed in the vehicle, identifies at least one nearby vehicle, determines (monitors repeatedly, periodically) at least one parameter (location, speed, width, length) of the identified nearby vehicle, and generate signals for controlling the vehicle using the at least one parameter of the nearby vehicle.

In embodiments, using information about surroundings of the vehicle at a first time point (t1, a first time frame), for each of the nearby vehicle, the controller (periodical, repeatedly) computes a parameter representing at least one from (1) relative movement (distance, velocity) between the subject vehicle and the nearby vehicle in a direction along the driving lane (longitudinal), (2) relative movement (distance, velocity) between the subject vehicle and the nearby vehicle in a direction across the driving lane (lateral), (3) a width of the nearby vehicle, and (4) a length of the nearby vehicle at the first time point. In embodiments, the controller computes the parameter for a second time point (t2, or a second time frame) later than the first time point and tracks change of the parameter.

In embodiments, using the changes of the computed parameter from the first time point to the second time point, the controller computes a misrecognition index representing a probability that exhaust gas from a nearby vehicle was mistaken as a structure of the nearby vehicle (or another) for the second time point, or to be mistaken for a second time point later than the second time point. When, the computed misrecognition index is greater than a predetermined threshold, the controller applies an additional process (S60) to correct/adjust information from the sensors or to correct/adjust at least one parameter computed from the information from the sensors. When the misrecognition index is lower than the predetermined threshold, location and/or speed of nearby vehicles under a normal process without applying the additional process/algorithm.

In embodiments, the greater the lateral direction relative movement (velocity) between the subject vehicle and the nearby vehicle, the greater is the misrecognition index. In embodiments, the smaller the longitudinal relative movement (velocity), the smaller is the misrecognition index. In embodiments, the greater change in width of the nearby vehicle, the greater the misrecognition index. In embodiments, the greater change in length of the nearby vehicle, the greater the misrecognition index.

FIG. 1 is a block diagram schematically illustrating a vehicle according to an embodiment of the present invention.

Referring to FIG. 1, the vehicle 10 is a vehicle to which autonomous navigation technology is applied. The autonomous navigation technology refers to technology that enables a vehicle to be automatically driven without driver intervention. The autonomous navigation technology aims at user convenience and safety of users through prevention of accidents.

The vehicle 10 may include an information extraction unit 100, an autonomous driving logic 200, and a drive unit 300.

The information extraction unit 100 is configured to collect information about the vicinity of the vehicle 10 and may include a distance measurement sensor 110 configured to acquire distance information about an object located in the vicinity of the vehicle 10, a camera 120 configured to acquire image information about the vicinity of the vehicle 10, and a speed sensor 130 configured to sense a speed at which the vehicle 10 is currently traveling.

In particular, the distance measurement sensor 110 may be implemented with LiDAR, radar, or an ultrasonic sensor. The distance measurement sensor 110 may emit a signal of a specific wavelength forward in a ToF (Time of Flight) manner, and then sense the distance to a preceding object using the difference in detection time of a reflected signal of a specific wavelength.

The autonomous driving logic 200 may be software, hardware, or a combination thereof to implement the function of autonomous driving. The autonomous driving logic 200 may be implemented as part of an electronic control unit (ECU) of the vehicle 10, but the present invention is not limited thereto.

The main logic 210 may be responsible for overall control of the autonomous driving function. The main control logic 210 may generate a signal for controlling the drive unit 300 based on the information provided by a nearby vehicle information extraction unit 220, an exhaust gas misrecognition removal unit 230, and/or a nearby vehicle information estimation unit 240.

The nearby vehicle information extraction unit 220 may generate various kinds of information about a nearby vehicle based on at least one of the distance information from the distance measurement sensor 110, the image from the camera 120, and the speed information about the vehicle 10. The nearby vehicle information extraction unit 220 may also determine whether to execute the exhaust gas removal algorithm, using various kinds of information. The exhaust gas removal algorithm refers to an algorithm executed by the exhaust gas misrecognition removal unit 230.

The exhaust gas misrecognition removal unit 230 may determine whether or not the detected nearby vehicle is an exhaust gas and the type of the exhaust gas using various kinds of information provided from the nearby vehicle information extraction unit 220 and correct the information about the corresponding nearby vehicle according to the determination.

The nearby vehicle information estimation unit 240 may use the position and speed of the nearby vehicle from the nearby vehicle information extraction unit 220 or the exhaust gas misrecognition removal unit 230 to estimate subsequent movement of the nearby vehicle.

The drive unit 300, which is configured to perform driving of the vehicle 10 according to the control signal of the main control logic 220, may include elements for substantially controlling driving of the vehicle such as a brake, an accelerator, a transmission, and a steering system.

For example, when the control signal of the main control logic 220 is a signal instructing lane change to the left lane through acceleration, driving control may be executed in which acceleration is applied by the accelerator of the drive unit 300 and torque is applied leftward by the steering system.

Figure 2:
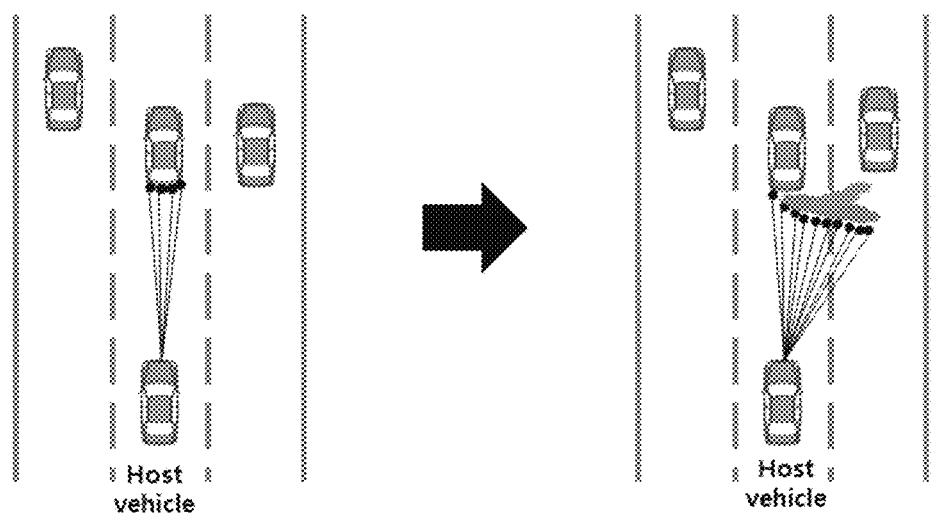
FIG. 2 illustrates an example of misrecognition of an exhaust gas.

FIG. 2 illustrates an example of misrecognition of an exhaust gas.

Referring to FIG. 2, the left diagram illustrates a case where the exhaust gas is not discharged from a nearby vehicle traveling in the same lane as the host vehicle (which means that the exhaust gas is naturally discharged from a traveling vehicle, but the amount of the exhaust gas is not so large as to cause misrecognition by the distance measurement sensor) at a first time point (t=t1), and the right diagram illustrates a case where the exhaust gas is discharged from the nearby vehicle traveling in the same lane at a second time point (t=t2, t2>t1) later than the first time point (t1).

First, in the left diagram, the distance measurement sensor 110 emits a signal of a specific wavelength forward and senses a reflected signal during travel of the host vehicle. Since reflection occurs at the rear body of the nearby vehicle (four reflection points are illustrated in FIG. 2, solid dots), the distance from the nearby vehicle traveling in the same lane and the shape of the nearby vehicle as sensed by the distance measurement sensor 110 match the actual nearby vehicle using distance from a first point of the subject vehicle to each of the four reflection points. In this case, controlling the drive unit 300 based on the distance information from the distance measurement sensor 110 causes no problem. A computing system of the subject vehicle is monitoring the distance repeatedly, periodically from t1 to t2.

However, in the right diagram (t=t2), the signal of a specific wavelength emitted forward from the distance measurement sensor 110 of the host vehicle is reflected off the exhaust gas emitted by the nearby vehicle, not the vehicle body of the nearby vehicle. Accordingly, the distance to the nearby vehicle traveling in the same lane sensed by the distance measurement sensor 110 (computed using distance from the first point of the subject vehicle to each of the ten reflection points—solid dots) is shorter than the actual distance (and the distance measured at the first time point t1), and the sensed shape of the nearby vehicle may spread further to the right. In this case, if the drive unit 300 is controlled based on the distance information from the distance measurement sensor 110, a control operation such as rapid deceleration or the like may be unnecessarily performed, which may be dangerous to the host vehicle and other nearby vehicles.

Figure 3:
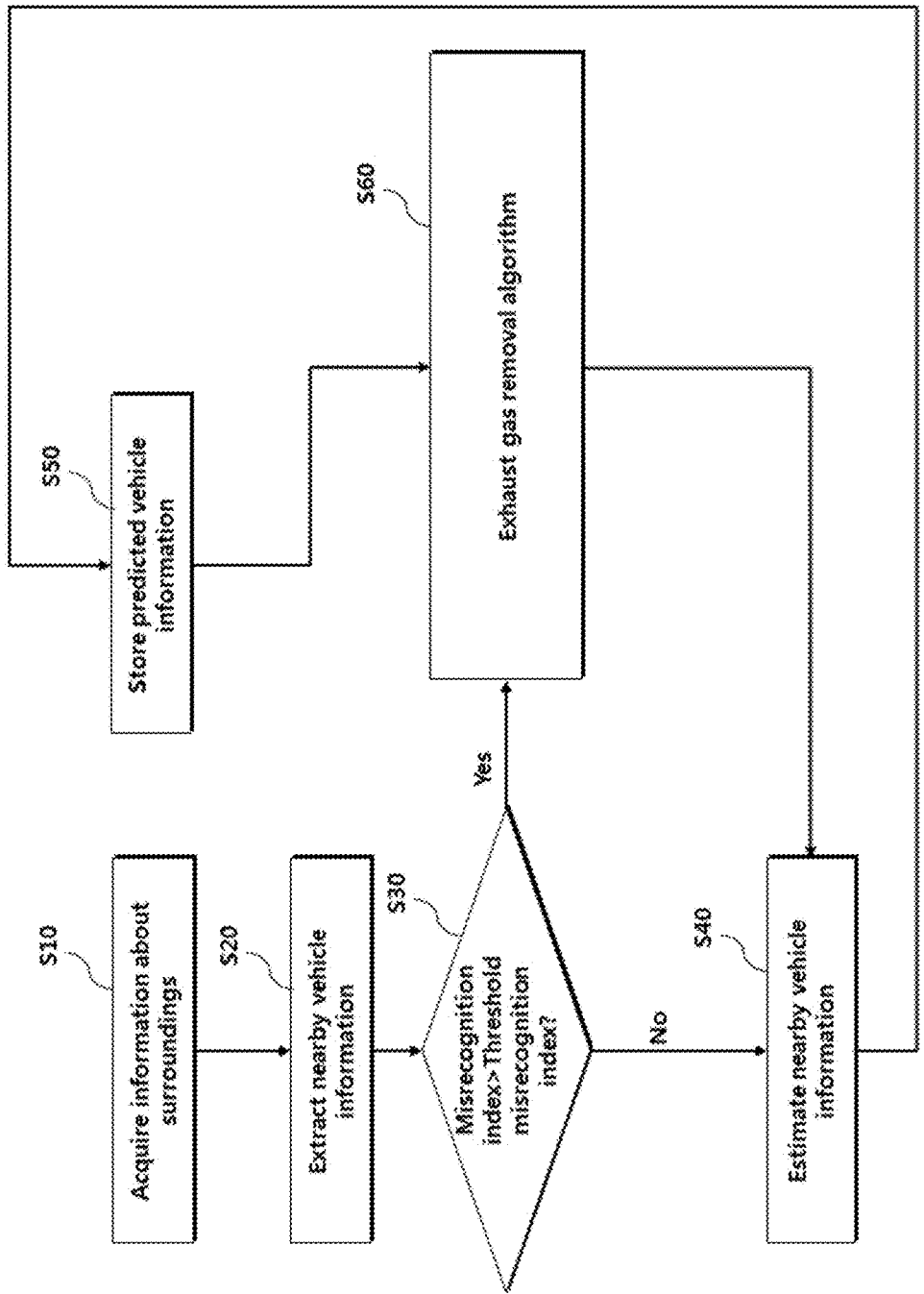
FIG. 3 is a flowchart illustrating operation of the autonomous driving logic shown in FIG. 1.
Figure 5:
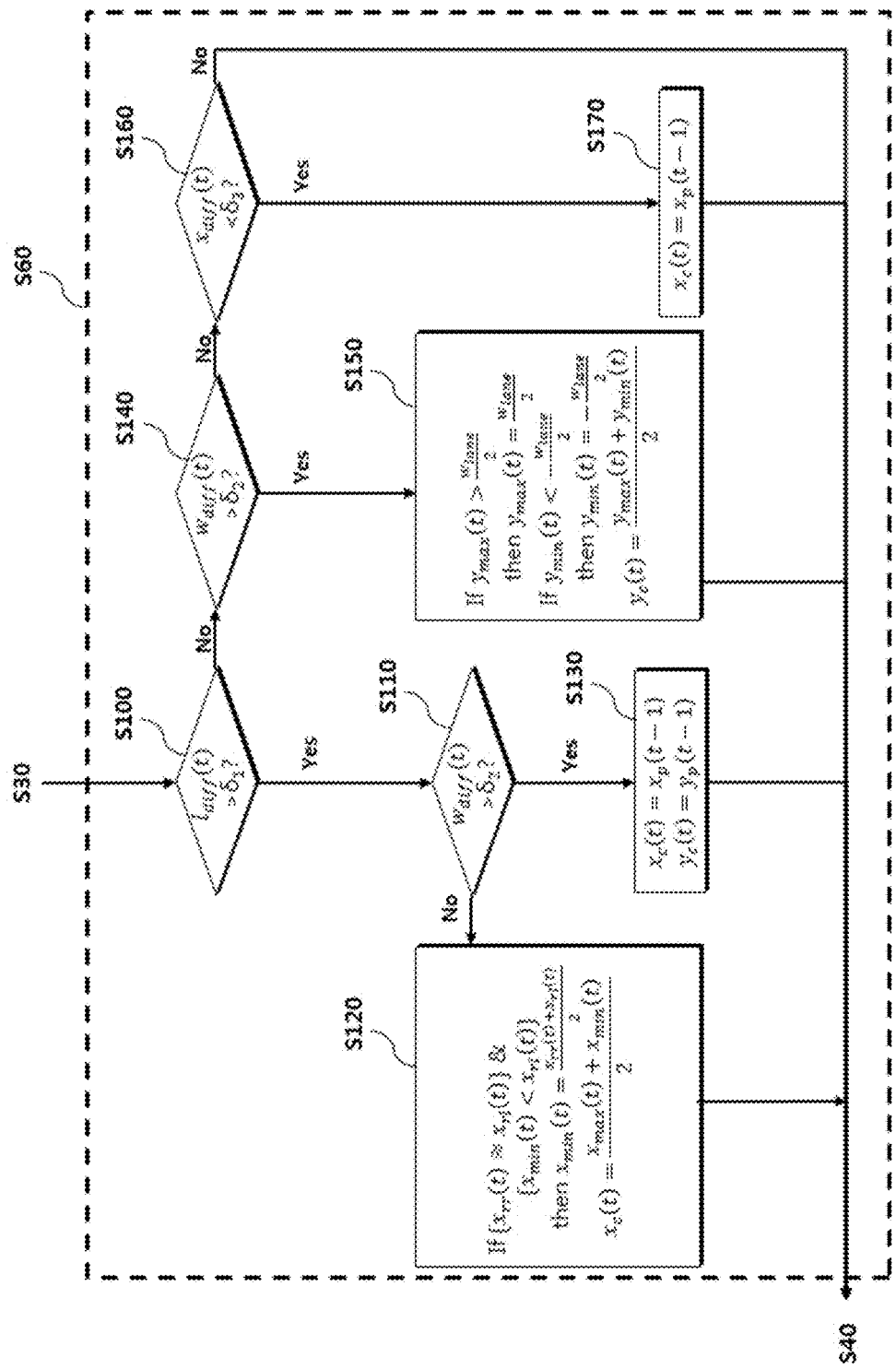
FIG. 5 illustrates an embodiment of an exhaust gas removal algorithm.
Figure 6:
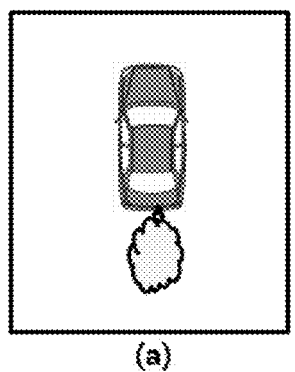
FIG. 6 illustrates an example of removing exhaust gas by the exhaust gas removal algorithm of FIG. 5.
Figure 6:
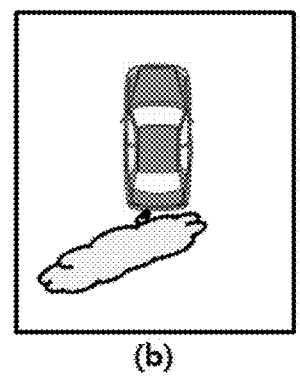
Figure 6:
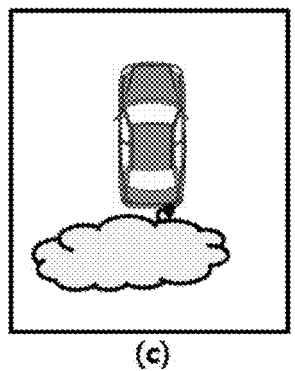
Figure 6:
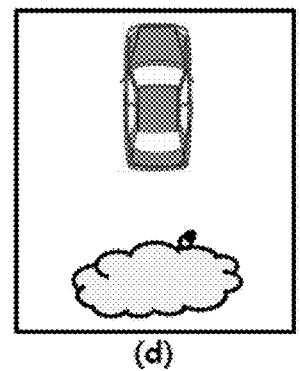

FIG. 3 is a flowchart illustrating operation of the autonomous driving logic shown in FIG. 1. FIG. 4 illustrates an example of calculation of a misrecognition index. FIG. 5 illustrates an embodiment of an exhaust gas removal algorithm. FIG. 6 illustrates an example of removing an exhaust gas by the exhaust gas removal algorithm of FIG. 5.

Referring to FIGS. 3 to 6, during travel of the host vehicle (hereinafter, the vehicle 10 is referred to as a host vehicle), the information extraction unit 100 of the host vehicle may collect information about the surroundings around the host vehicle (S10). The collected information may include distance information on a distance sensed at each angle (e.g., with an increment of 1 degree) within a certain angular range (e.g., 120 degrees) in front of the distance measurement sensor 110, captured image information about the front, and the travel speed of the host vehicle. The collected vicinity information may be transmitted to the nearby vehicle information extraction unit 220.

The nearby vehicle information extraction unit 220 may cluster distances sensed at each angle within a certain angular range into at least one nearby vehicle. For example, if it is sensed that objects have distances within a certain distance range within a continuous angular range, the objects may be clustered into one nearby vehicle.

The nearby vehicle information extraction unit 220 may acquire two-dimensional coordinates of the vertexes (rear left vertex, rear right vertex, front left vertex, and front right vertex) of each nearby vehicle in a coordinate system centered on the host vehicle. If the coordinates of some of the vertexes of the nearby vehicle fail to be acquired directly from the distance information, the nearby vehicle information extraction unit 220 may estimate the shape of the nearby vehicle to acquire the coordinates of the vertexes which have failed to be acquired. Various parameters (e.g., the minimum longitudinal coordinate, the minimum letter coordinate, the maximum longitudinal coordinate, the maximum lateral coordinate, the longitudinal center coordinate, the lateral center coordinate, a vehicle width, and a vehicle length) of the nearby vehicle may be calculated based on the vertex coordinates of the nearby vehicle. In this specification, the longitudinal direction refers to the forward (or travel) direction of the vehicle or the extension direction of the X-axis, and the lateral direction refers to the direction perpendicular to the forward (travel) direction of the host vehicle or the extension direction of the Y-axis. When it is assumed that the position of the host is the origin (0, 0), the X coordinate increases as a point moves from left to right, and the Y coordinate increases as the point moves up.

The nearby vehicle information extraction unit 220 may perform a computational operation on the parameters of the nearby vehicle in the previous frame and the parameters of the nearby vehicle in the current frame to calculate various parameters (for example, a longitudinal change rate, a letter change rate, a vehicle width change rate, and a vehicle length change rate) may be calculated. Here, the frame may refer to a set of nearby vehicle information generated at a certain time.

The nearby vehicle information extraction unit 220 may acquire the lane width of the lane in which the host vehicle is traveling and the lane information about the host vehicle and nearby vehicles from an image from the camera 120. According to another embodiment, the nearby vehicle information extraction unit 220 may acquire the lane width of the lane in which the host vehicle is traveling and the lane information about the host vehicle and nearby vehicles from a navigation program.

The nearby vehicle information extraction unit 220 may acquire information on the travel speed (longitudinal speed and lateral speed) of the host vehicle from the speed sensor 130.

That is, the nearby vehicle information extraction unit 220 may extract various kinds of information (hereinafter, referred to as "nearby vehicle information") about the nearby vehicles and the host vehicle required in the subsequent steps (S20).

The nearby vehicle information extraction unit 220 may calculate a misrecognition index using the extracted information, and compare the misrecognition index with a threshold misrecognition index to determine whether to execute the exhaust gas removal algorithm (S30). The threshold misrecognition index may be a value experimentally determined in consideration of sensor error, etc. For example, the threshold misrecognition index may be 1.5, but the present invention is not limited thereto.

FIG. 4 shows an embodiment of calculation of a misrecognition index $P_{gas}$.

The misrecognition index $P_{gas}$ may be calculated for each nearby vehicle and may be calculated by calculating and summing the lateral movement index, the longitudinal movement index, the width change index, and the length change index of the nearby vehicle. According to an embodiment, the misrecognition index $P_{gas}$ may not include at least one of the lateral movement index, the longitudinal movement index, the width change index, and the length change index of the nearby vehicle.

The lateral movement index of the nearby vehicle is represented as the product of the difference (absolute value) between the lateral change rate $y_{diff}(t)$ of the nearby vehicle and the lateral velocity $v_y(t)$ of the host vehicle and the ratio of the vehicle width $w(t)$ of the nearby vehicle to the average vehicle width $w_{car}$.

The lateral change rate $y_{diff}(t)$ of the nearby vehicle is the result obtained by subtracting the lateral coordinate of the center of the previous frame from the lateral coordinate of the center of the current frame (the average of the maximum coordinate and the minimum coordinate in the lateral direction) and dividing the subtraction result by an inter-frame time, and indicates the speed at which the nearby vehicle moves in the lateral direction. Thus, the difference (absolute value) between the lateral change rate $y_{diff}(t)$ of the nearby vehicle and the lateral velocity $v_y(t)$ of the host vehicle may indicate the difference in lateral velocity between the nearby vehicle and the host vehicle.

Considering that the lateral movement velocity of the nearby vehicle would be almost equal to the lateral movement velocity of the host vehicle except for a special situation (for example, during lane change) when the nearby vehicle travels in the same direction as the host vehicle, a large difference between the lateral change rate $y_{diff}(t)$ of the nearby vehicle and the lateral velocity $v_y(t)$ of the host vehicle may mean that the shape of the nearby vehicle is close to that of exhaust gas.

In addition, the average vehicle width $w_{car}$ represents the average vehicle width of the nearby vehicle, which may be predetermined as the typical vehicle width of an average car. According to another embodiment, when the vehicle type of the nearby vehicle can be identified through other information (for example, image information), the vehicle width of the nearby vehicle may be determined with reference to a table in which pre-stored vehicle types are mapped to the corresponding vehicle widths. The vehicle width $w(t)$ of the nearby vehicle may be calculated from the difference (absolute value) between the maximum lateral coordinate and the minimum lateral coordinate. The ratio of the vehicle width $w(t)$ of the nearby vehicle to the average vehicle width $w_{car}$ may indicate whether or not the vehicle width of the nearby vehicle is abnormal.

Considering that the vehicle width of the nearby vehicle would be approximately the same as the average vehicle width for a normal nearby vehicle, a high ratio of the vehicle width $w(t)$ of the nearby vehicle to the average vehicle width $w_{car}$ may indicate that the shape of the nearby vehicle is close to that of exhaust gas.

That is, the lateral movement index of the nearby vehicle corresponds to an index indicating how close the shape of the nearby vehicle is to that of exhaust gas in relation to the lateral movement (or shape).

The longitudinal movement index of the nearby vehicle may be expressed as a product of the difference between the longitudinal change rate $x_{diff}(t)$ of the nearby vehicle and the longitudinal velocity $v_x(t)$ of the host vehicle and the ratio of the vehicle length $l(t)$ of the nearby vehicle to the average vehicle length $l_{bump}$.

The longitudinal change rate $x_{diff}(t)$ of the nearby vehicle is the result obtained by subtracting the longitudinal coordinate of the center of the previous frame from the longitudinal coordinate of the center of the current frame (the average of the maximum coordinate and the minimum coordinate in the longitudinal direction) and dividing the subtraction result by an inter-frame time, and indicates the speed at which the nearby vehicle moves in the longitudinal direction. Thus, the difference (absolute value) between the longitudinal change rate $x_{diff}(t)$ of the nearby vehicle and the longitudinal velocity $v_x(t)$ of the host vehicle may indicate the difference in longitudinal velocity between the nearby vehicle and the host vehicle.

Considering that the longitudinal movement velocity of the nearby vehicle would be almost equal to the longitudinal movement velocity of the host vehicle except for a special situation (for example, during lane change) when the nearby vehicle travels in the same direction as the host vehicle, a small difference between the longitudinal change rate $x_{diff}(t)$ of the nearby vehicle and the longitudinal velocity $v_x(t)$ of the host vehicle may mean that the shape of the nearby vehicle is close to that of exhaust gas.

Here, unlike the lateral movement index, the absolute value of the difference between the longitudinal change rate $x_{diff}(t)$ of the nearby vehicle and the longitudinal velocity $v_x(t)$ of the host vehicle is used in the longitudinal movement index. A negative value of the longitudinal movement index means that the nearby vehicle moves rapidly away from the host vehicle as the difference between the longitudinal change rate $x_{diff}(t)$ of the nearby vehicle and the longitudinal velocity $v_x(t)$ of the host vehicle increases, which in turn means that execution of the exhaust gas removal algorithm is less beneficial irrespective of safety of the host vehicle, and thus omitting the algorithm can contribute to system efficiency.

In addition, the average vehicle length $l_{bump}$ represents the average vehicle length of the nearby vehicle, which may be predetermined as the typical vehicle length of an average car. According to another embodiment, when the vehicle type of the nearby vehicle can be identified through other information (for example, image information), the vehicle length of the nearby vehicle may be determined with reference to a table in which pre-stored vehicle types are mapped to the corresponding vehicle lengths. The vehicle length $l(t)$ of the nearby vehicle may be calculated from the difference (absolute value) between the maximum longitudinal coordinate and the minimum longitudinal coordinate. The ratio of the vehicle length $l(t)$ of the nearby vehicle to the average vehicle length $l_{bump}$ may indicate whether or not the vehicle length of the nearby vehicle is abnormal.

Considering that the vehicle length of the nearby vehicle would be approximately the same as the average vehicle length for a normal nearby vehicle, a high ratio of the vehicle length $l(t)$ of the nearby vehicle to the average vehicle length $l_{bump}$ may indicate that the shape of the nearby vehicle is close to that of exhaust gas.

That is, the longitudinal movement index of the nearby vehicle corresponds to an index indicating how close the shape of the nearby vehicle is to that of exhaust gas in relation to the longitudinal movement (or shape).

The width change index represents the absolute value of the vehicle width change rate $w_{diff}(t)$ of the nearby vehicle and may be calculated by dividing the difference between the vehicle width $w(t)$ of the nearby vehicle in the current frame and the vehicle width $w(t-1)$ of the nearby vehicle in the previous frame by an inter-frame time.

Considering that a normal nearby vehicle would hardly exhibit change in length over time except for in a special situation (e.g., lane change), a high absolute value of the vehicle width change rate $w_{diff}(t)$ of the nearby vehicle may mean that the shape of the nearby vehicle is close to that of exhaust gas.

The length change index represents the absolute value of the vehicle length change rate $l_{diff}(t)$ of the nearby vehicle and may be calculated by dividing the difference between the vehicle length $l(t)$ of the nearby vehicle in the current frame and the vehicle length l(t−1) of the nearby vehicle in the previous frame by an inter-frame time.

Considering that a normal nearby vehicle would hardly exhibit change in length over time except for in a special situation (e.g., lane change), a high absolute value of the vehicle length change rate $l_{diff}(t)$ of the nearby vehicle may mean that the shape of the nearby vehicle is close to that of exhaust gas.

Accordingly, the misrecognition index $P_{gas}$ indicates the degree of closeness of the shape of the nearby vehicle to that of exhaust gas, and the nearby vehicle information extraction unit 220 compares the misrecognition index $P_{gas}$ with a threshold misrecognition index. If the misrecognition index $P_{gas}$ exceeds the threshold misrecognition index (YES in S30), the information extraction unit 220 controls the exhaust gas misrecognition removal unit 230 to execute the exhaust gas removal algorithm. If the misrecognition index $P_{gas}$ is less than or equal to the threshold misrecognition index (NO in S30), the information extraction unit 220 performs a control operation such that step S40 is performed without executing the exhaust gas removal algorithm.

The nearby vehicle information estimation unit 240 may estimate movement of the nearby vehicle after the current frame, using the position and velocity of the nearby vehicle from among various kinds of information about the nearby vehicles (or nearby vehicle information) of the nearby vehicle information extraction unit 220 and/or various kinds of corrected information about the nearby vehicle (or corrected nearby vehicle information). The nearby vehicle information estimation unit 240 may estimate the position of the nearby vehicle in the next frame, that is, a predicted longitudinal coordinate $x_p(t)$ of the center and a predicted lateral coordinate $y_p(t)$ of the center.

Here, the estimation operation may be performed by calculating the velocity (the longitudinal change rate and the lateral change rate) and the inter-frame time from the determined position (the longitudinal coordinate and lateral coordinate of the center) of the nearby vehicle and calculating the predicted longitudinal coordinate $x_p(t)$ and predicted lateral coordinate $y_p(t)$ of the center in the next frame, but embodiments of the present invention are not limited thereto.

The nearby vehicle information estimation unit 240 may estimate not only the position of the nearby vehicle in the next frame but also the position of the nearby vehicle in subsequent frames and may also estimate other information (e.g., velocity) in addition to the position of the nearby vehicle.

The nearby vehicle information estimation unit 240 may store the estimated information about the nearby vehicle after the current frame, that is, the predicted vehicle information (S50).

FIG. 5 shows an exhaust gas removal algorithm for correcting the nearby vehicle information performed by the exhaust gas misrecognition removal unit 230.

The exhaust gas misrecognition removal unit 230 may determine whether the vehicle length change rate $l_{diff}(t)$ of the nearby vehicle exceeds a first threshold index δ1 (S100). The first threshold index δ1 may be a value experimentally determined in consideration of sensor error, a change in vehicle length at the time of lane change, and the like.

If the vehicle length change rate $l_{diff}(t)$ of the nearby vehicle exceeds a first threshold index δ1 (Yes in S100), this may mean that the longitudinal information about the nearby vehicle is unreliable, and the exhaust gas misrecognition removal unit 230 may determine whether or not the vehicle width change rate $W_{diff}(t)$ of the nearby vehicle exceeds a second threshold index δ2 (S110). The second threshold index δ2 may be a value experimentally determined in consideration of sensor error, a change in vehicle length at the time of lane change, and the like.

If the vehicle width change rate $w_{diff}(t)$ of the nearby vehicle is less than or equal to the second threshold index δ2 (No in S110), this means that the lateral information about the nearby vehicle is reliable, and therefore the exhaust gas misrecognition removal unit 230 will correct only the longitudinal information about the nearby vehicle.

If the X coordinate $x_{rr}(t)$ of the rear right vertex and the X-coordinate $x_{rl}(t)$ of the rear left vertex are substantially equal to each other (for example, with a difference within several tens of centimeters) and the minimum longitudinal coordinate $x_{min}(t)$ is less than the X-coordinate $x_{rl}(t)$ of the rear left vertex, the exhaust gas misrecognition removal unit 230 may correct the minimum longitudinal coordinate $x_{min}(t)$ to the average of the X coordinate $x_{rr}(t)$ of the rear right vertex and the X-coordinate $x_{rl}(t)$ of the rear left vertex. Thereby, the longitudinal center coordinate $x_c(t)$ of the nearby vehicle may be calculated as the average of the corrected minimum longitudinal coordinates $x_{min}(t)$ and the maximum longitudinal coordinate $x_{max}(t)$ (S120).

Therefore, according to step S120, distortion of the longitudinal information about the nearby vehicle caused by misrecognizing the exhaust gas discharged from the rear center of the vehicle and clustered, such as the exhaust gas shown in (a) of FIG. 6, as the nearby vehicle may be minimized.

If the vehicle width change rate $w_{diff}(t)$ of the nearby vehicle exceeds the second threshold value δ2 (Yes in S110), this means that the lateral information about the nearby vehicle is also unreliable, and thus the exhaust gas misrecognition removal unit 230 corrects both the longitudinal information and the lateral information about the nearby vehicle the adjacent vehicle in step S130.

Since both the longitudinal information and the lateral information about the nearby vehicle acquired in the current frame are unreliable, the exhaust gas misrecognition removal unit 230 may determine the predicted longitudinal center coordinate $x_p(t-1)$ and predicted lateral center coordinate $y_p(t-1)$ estimated and stored in the previous frame as the longitudinal center coordinate $x_c(t)$ and lateral center coordinate $y_c(t)$ of the nearby vehicle in the current frame (S130).

Therefore, according to step S130, distortion of the longitudinal information and the lateral information about the nearby vehicle due to recognition of the exhaust gas discharged in an irregular form, such as the exhaust gas shown in (b) of FIG. 6, as a nearby vehicle, may be minimized.

If the vehicle length change rate $l_{diff}(t)$ of the nearby vehicle is less than or equal to the first threshold index δ1 (No in S100), this means that the longitudinal information about the nearby vehicle is reliable, and the exhaust gas misrecognition removal unit 230 may determine whether or not the vehicle width change rate $w_{diff}(t)$ of the nearby vehicle exceeds the second threshold index δ2 (S140).

If the vehicle width change rate $w_{diff}(t)$ of the nearby vehicle exceeds the second threshold value δ2 (Yes in S140), this means that the lateral information about the nearby vehicle is unreliable, and therefore the exhaust gas misrecognition removal unit 230 will correct only the lateral information about the nearby vehicle in step S150.

If the maximum lateral coordinate $y_{max}(t)$ exceeds half the lane width of the lane of the host vehicle $\frac{w_{lane}}{2}$, the exhaust gas misrecognition removal unit 230 may correct the maximum lateral coordinate $y_{max}(t)$ to be equal to half the lane width $$\frac{w_{lane}}{2}.$$

Further, if the minimum lateral coordinate $y_{min}(t)$ is less than a negative value of half the lane width of the lane of the host vehicle $$-\frac{w_{lane}}{2},$$

the exhaust gas misrecognition removal unit 230 may correct the minimum lateral coordinate $y_{min}(t)$ to be equal to the negative value of half the lane width $$-\frac{w_{lane}}{2}$$

(S150).

Here, the correction conditions and corrected values are given on the assumption that the nearby vehicle is located in the same lane as the lane in which the host vehicle is traveling. If the nearby vehicle is located in a lane different from the lane in which the host vehicle is traveling, the correction conditions and corrected values may be changed using the lane information about the nearby vehicle.

For example, when the host vehicle travels in the k-th lane (where k is an integer greater than or equal to 1) and the nearby vehicle travels in the m-th lane (where m is an integer greater than or equal to 1), if the maximum lateral coordinate $y_{max}(t)$ exceeds a value obtained by adding half the lane width of the lane of the host vehicle $$\frac{w_{lane}}{2}$$

to the product of the lane width of the lane and (m-k), the exhaust gas misrecognition removal unit 230 may correct the maximum lateral coordinate $y_{max}(t)$ to be equal to the value obtained by adding half the lane width of the lane of the host vehicle $$\frac{w_{lane}}{2}$$

to the product of the lane width of the lane and (m-k). Further, if the minimum lateral coordinate $y_{min}(t)$ is less than a value obtained by adding the negative value of half the lane width of the lane of the host vehicle $$-\frac{w_{lane}}{2}$$

to the product of the lane width of the lane and (m-k), the exhaust gas misrecognition removal unit 230 may correct the minimum lateral coordinate $y_{min}(t)$ to be equal to the value obtained by adding the negative value of half the lane width of the lane $$-\frac{w_{lane}}{2}$$

to the product of the lane width of the lane and (m-k).

Thereby, the lateral center coordinate MO of the nearby vehicle may be calculated as the average of the corrected minimum lateral coordinate $y_{min}(t)$ and the corrected maximum lateral coordinate $y_{max}(t)$ (S150).

Therefore, according to step S150, distortion of the longitudinal information about the nearby vehicle due to recognition of the exhaust gas discharged from the rear of the vehicle in a laterally spreading manner, such as the exhaust gas shown in (c) of FIG. 6, as the nearby vehicle, may be minimized.

If the vehicle width change rate $w_{diff}(t)$ of the nearby vehicle is less than or equal to the second threshold index δ2 (No in S140), this means that the lateral information about the nearby vehicle is also reliable. However, distortion of the longitudinal information about the nearby vehicle may cause a serious safety risk. Accordingly, step S160 may be additionally performed.

That is, the exhaust gas misrecognition removal unit 230 may determine whether the longitudinal change rate $x_{diff}(t)$ of the nearby vehicle is less than a third threshold index δ3 (S160). The third threshold index δ3 may have a value experimentally determined in consideration of the sensor error, the speed of the host vehicle, and the like. The third threshold index δ3 may be a negative number, but embodiments of the present invention are not limited thereto.

If the longitudinal change rate $x_{diff}(t)$ of the nearby vehicle is less than the third threshold index δ3, this means that the nearby vehicle moves fast toward the host vehicle. Therefore, movement toward the host vehicle at a speed out of the normal range may be considered as indicating an exhaust gas discharged from the nearby vehicle and remaining where the gas was discharged, rther than the nearby vehicle.

Therefore, if the longitudinal change rate $x_{diff}(t)$ of the nearby vehicle is less than the third threshold index δ3, (Yes in S160), the exhaust gas misrecognition removal unit 230 may determine the predicted longitudinal center coordinate $x_p(t-1)$ estimated and stored in the previous frame as the longitudinal center coordinate $x_c(t)$ of the nearby vehicle in the current frame, considering that the longitudinal information about the nearby vehicle acquired in the current frame is unreliable (S170).

Therefore, according to step S170, distortion of the longitudinal information about the nearby vehicle due to recognition of the exhaust gas discharged from the nearby vehicle and remaining where the gas was discharged, such as the exhaust gas shown in (d) of FIG. 6, as the nearby vehicle may be minimized.

If the longitudinal change rate $x_{diff}(t)$ of the nearby vehicle is greater than or equal to the third threshold index δ3 (No in S160), the longitudinal information and lateral information about the nearby vehicle acquired in the current frame may be considered reliable, and thus step S0 may be performed using the uncorrected longitudinal information and uncorrected lateral information about the nearby vehicle.

That is, in a vehicle according to an embodiment of the present invention, distortion of information about a nearby vehicle such as the position and the speed of the nearby vehicle due to misrecognition of the exhaust gas discharged from the nearby vehicle as a part of the nearby vehicle may be minimized.

The method described above may be implemented in a computer-readable recording medium as code readable by a computer. The computer-readable recording medium includes all kinds of recording media configured to store data readable by the computer system. Examples of the computer-readable recording media include ROMs (read-only memories), RAMS (random access memories), magnetic tapes, magnetic disks, flash memories and optical data storage devices. The computer-readable recording media may be distributed to computer systems connected over a network, and thus computer-readable code may be stored and executed in a distributed manner.

As apparent from the above description, embodiments of the present invention have effects as follows.

An ECU, an autonomous vehicle including the ECU, and a method of recognizing a nearby vehicle for the same according to an embodiment of the present invention may minimize distortion of information such as the position, speed, and the like of a nearby vehicle due to misrecognition of the exhaust gas discharged from the nearby vehicle a part of the nearby vehicle.

The effects which can be obtained by embodiments of the present invention are not limited to the above-mentioned effects, and other effects not mentioned herein can be clearly understood by those skilled in the art from the description above.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A method of recognizing a nearby vehicle for an autonomous vehicle comprising an electronic control unit (ECU), the method comprising:
    extracting, by the electronic control unit (ECU), nearby vehicle information by sensing at least one nearby vehicle based on a distance from a host vehicle;
    calculating, by the electronic control unit (ECU), a misrecognition index indicating a degree of closeness of a shape of the at least one nearby vehicle to a shape of an exhaust gas based on the nearby vehicle information;
    comparing, by the electronic control unit (ECU), the misrecognition index with a threshold misrecognition index;
    executing, by the electronic control unit (ECU), an exhaust gas removal algorithm for correcting the nearby vehicle information when the misrecognition index is greater than the threshold misrecognition index; and
    estimating, by the electronic control unit (ECU), movement of the at least one nearby vehicle after a current frame using the nearby vehicle information obtained through the exhaust gas removal algorithm,
    wherein the misrecognition index comprises at least one of a lateral movement index, a longitudinal movement index, a width change index, and a length change index of the at least one nearby vehicle,
    wherein the lateral movement index is a product of a difference between a lateral change rate of the at least one nearby vehicle and a lateral change rate of the host vehicle and a ratio of a vehicle width of the at least one nearby vehicle to an average vehicle width,
    wherein the longitudinal movement index is a product of a difference between a longitudinal change rate of the at least one nearby vehicle and a longitudinal change rate of the host vehicle and a ratio of a vehicle length of the at least one nearby vehicle to an average vehicle length,
    wherein the width change index is an absolute value of a vehicle width change rate of the at least one nearby vehicle,
    wherein the length change index is an absolute value of a vehicle length change rate of the at least one nearby vehicle.

2. The method according to claim 1, wherein the extracting of the nearby vehicle information comprises:
    identifying the at least one nearby vehicle when the at least one nearby vehicle is within a certain range of distance from the host vehicle and within a continuous angular range.

3. The method according to claim 1, wherein the nearby vehicle information comprises at least one of vertex coordinates, a minimum longitudinal coordinate, a minimum lateral coordinate, a maximum longitudinal coordinate, a maximum lateral coordinate, a longitudinal center coordinate, a lateral center coordinate, the vehicle width, the vehicle length, the longitudinal change rate, the lateral change rate, the vehicle width change rate and the vehicle length change rate of the at least one nearby vehicle.

4. The method according to claim 1, wherein the executing of the exhaust gas removal algorithm comprises:
    correcting the minimum longitudinal coordinate to be an average of an X coordinate of a rear right vertex and an X coordinate of a rear left vertex when the X coordinate of the rear right vertex and the X coordinate of the rear left vertex are within a certain range, and the minimum longitudinal coordinate is less than the X coordinate of the rear left vertex; and
    correcting the longitudinal center coordinate of the at least one nearby vehicle to be an average of the minimum longitudinal coordinate and the maximum longitudinal coordinate,
    wherein the correcting of the minimum longitudinal coordinate and the correcting of the longitudinal center coordinate are performed when the vehicle length change rate of the at least one nearby vehicle exceeds a first threshold index and the vehicle width change rate of the at least one nearby vehicle is less than or equal to a second threshold index.

5. The method according to claim 1, wherein the executing of the exhaust gas removal algorithm comprises:

determining, when the vehicle length change rate of the at least one nearby vehicle exceeds a first threshold index and the vehicle width change rate of the at least one nearby vehicle exceeds a second threshold index, a predicted longitudinal center coordinate and a predicted lateral center coordinate estimated and stored in a previous frame as a longitudinal center coordinate and a lateral direction center coordinate of the at least one nearby vehicle in a current frame, respectively.

6. The method according to claim 1, wherein the executing of the exhaust gas removal algorithm comprises:
correcting the maximum lateral coordinate to be equal to half the lane width, when the maximum lateral coordinate exceeds half a lane width of a lane in which the host vehicle is travelling; and
correcting the minimum lateral coordinate to be equal to a negative value of half the lane width when the minimum lateral coordinate is less than the negative value of half the lane width,
wherein the correcting of the maximum lateral coordinate and the correcting of the minimum lateral coordinate are performed when the vehicle length change rate of the at least one nearby vehicle is less than or equal to a first threshold index and the vehicle width change rate of the at least one nearby vehicle exceeds a second threshold index.

7. The method according to claim 1, wherein the executing of the exhaust gas removal algorithm comprises:
determining, when the vehicle length change rate of the at least one nearby vehicle is less than or equal to a first threshold index, the vehicle width change rate of the at least one nearby vehicle is less than or equal to a second threshold index, and the longitudinal change rate of the at least one nearby vehicle is less than a third threshold index, a predicted longitudinal center coordinate estimated and stored in a previous frame as a longitudinal center coordinate of the at least one nearby vehicle in a current frame.

8. An electronic control unit (ECU) for an autonomous vehicle, the ECU comprising:
a nearby vehicle information extraction unit configured to extract nearby vehicle information by sensing at least one nearby vehicle based on a distance from a host vehicle and to calculate an misrecognition index indicating a degree of closeness of a shape of the at least one nearby vehicle to a shape of an exhaust gas based on the nearby vehicle information;
an exhaust gas misrecognition removal unit configured to compare the misrecognition index with a threshold misrecognition index and to execute an exhaust gas removal algorithm for correcting the nearby vehicle information when the misrecognition index is greater than the threshold misrecognition index; and
a nearby vehicle information estimation unit configured to estimate movement of the at least one nearby vehicle after a current frame using the nearby vehicle information obtained through the exhaust gas removal algorithm;
wherein the misrecognition index comprises at least one of a lateral movement index, a longitudinal movement index, a width change index, and a length change index of the at least one nearby vehicle,
wherein the lateral movement index is a product of a difference between a lateral change rate of the at least one nearby vehicle and a lateral change rate of the host vehicle and a ratio of a vehicle width of the at least one nearby vehicle to an average vehicle width,
wherein the longitudinal movement index is a product of a difference between a longitudinal change rate of the at least one nearby vehicle and a longitudinal change rate of the host vehicle and a ratio of a vehicle length of the at least one nearby vehicle to an average vehicle length,
wherein the width change index is an absolute value of a vehicle width change rate of the at least one nearby vehicle,
wherein the length change index is an absolute value of a vehicle length change rate of the at least one nearby vehicle.

9. The ECU according to claim 8, wherein, when the vehicle length change rate of the at least one nearby vehicle exceeds a first threshold index and the vehicle width change rate of the at least one nearby vehicle is less than or equal to a second threshold index,
the exhaust gas misrecognition removal unit is configured to:
correct the minimum longitudinal coordinate to be an average of an X coordinate of a rear right vertex and an X coordinate of a rear left vertex when the X coordinate of the rear right vertex and the X coordinate of the rear left vertex are within a certain range and the minimum longitudinal coordinate is less than the X coordinate of the rear left vertex, and
correct the longitudinal center coordinate of the at least one nearby vehicle to be an average of the minimum longitudinal coordinate and the maximum longitudinal coordinate.

10. The ECU according to claim 8, wherein, when the vehicle length change rate of the at least one nearby vehicle exceeds a first threshold index and the vehicle width change rate of the at least one nearby vehicle exceeds a second threshold index,
the exhaust gas misrecognition removal unit configured to determine a predicted longitudinal center coordinate and a predicted lateral center coordinate estimated and stored in a previous frame as a longitudinal center coordinate and a lateral direction center coordinate of the at least one nearby vehicle in a current frame, respectively.

11. The ECU according to claim 8, wherein, when the vehicle length change rate of the at least one nearby vehicle is less than or equal to a first threshold index and the vehicle width change rate of the at least one nearby vehicle exceeds a second threshold index,
the exhaust gas misrecognition removal unit is configured to correct, when the maximum lateral coordinate exceeds half a lane width of a lane in which the host vehicle is travelling, the maximum lateral coordinate to be equal to half the lane width, and further configured to correct the minimum lateral coordinate to be equal to a negative value of half the lane width when the minimum lateral coordinate is less than the negative value of half the lane width.

12. The ECU according to claim 8, wherein, when the vehicle length change rate of the at least one nearby vehicle is less than or equal to a first threshold index, the vehicle width change rate of the at least one nearby vehicle is less than or equal to a second threshold index, and the longitudinal change rate of the at least one nearby vehicle is less than a third threshold index,
the exhaust gas misrecognition removal unit is configured to determine a predicted longitudinal center coordinate estimated and stored in a previous frame as a longitudinal center coordinate of the at least one nearby vehicle in a current frame.

13. An autonomous vehicle comprising:
the ECU of claim 8; and
a driving unit configured to control the driving of the vehicle according to a control signal generated by the ECU.

* * * * *